United States Patent [19]

Ohno et al.

[11] 4,395,721
[45] Jul. 26, 1983

[54] LASER BEAM PRINTER

[75] Inventors: Mitsuo Ohno, Hadano; Kikuo Hatazawa, Atsugi; Akira Abe, Hadano, all of Japan

[73] Assignee: Hitachi, Ltd., Tokyo, Japan

[21] Appl. No.: 261,669

[22] Filed: May 7, 1981

[30] Foreign Application Priority Data

May 9, 1980 [JP] Japan .................................. 55-60652

[51] Int. Cl.³ .......................... G01D 15/00; H04N 1/04
[52] U.S. Cl. ...................................... 346/160; 358/293
[58] Field of Search ..................... 346/76 L, 108, 160, 346/139 R, 141; 358/285, 293, 300; 350/6.8

[56] References Cited

U.S. PATENT DOCUMENTS 3,750,189  7/1973  Fleischer .............................. 346/160
4,195,316  3/1980  Sansome .............................. 358/285

*Primary Examiner*—John Gonzales
*Assistant Examiner*—Thomas H. Tarcza
*Attorney, Agent, or Firm*—Antonelli, Terry & Wands

[57] ABSTRACT

A laser beam printer in which latent images are produced on a light-sensitive drum through line scanning with a laser beam modulated with print information to be printed. The laser beam is modulated with the information to be printed in such a manner that the light sensitive drum is irradiated with the laser beam except for those portions which are to be printed. The line scanning is effected with the laser beam modulated in accordance with the print information in a non-superposed manner on one hand and on the other hand with the laser beam which is modulated by information synthesized from the printing information for every two adjacent line scanning so that these two adjacent line scannings are partially covered by the line scanning based on the synthesized information.

4 Claims, 8 Drawing Figures

LASER BEAM PRINTER

BACKGROUND OF THE INVENTION

The present invention generally relates to a laser printer. In particular, the invention concerns a control of a picture, pattern or image signal in the laser printer.

In the laser printers in general, a laser beam produced by a laser device is modulated in accordance with information to be printed, whereby a rotating light-sensitive drum is scanned with the modulated light beam through a scanner to thereby produce a corresponding latent image on the drum surface. Subsequently, the latent image is developed on the drum surface by means of developing toner. The toner image thus developed is then transferred to a recording sheet. The scanner is usually constituted by a polyhedron mirror and rotated at a high speed. An examplary structure of such laser printer is disclosed in U.S. Pat. No. 3,750,189. The development process is generally classified into two types. According to the first type of development, those portions which are irradiaed with the light beam are printed in black with toner. On the other hand, according to the second type development, those portions which are not irradiated with the light beam are printed. The latter type development is referred to as the positive development. The present invention can be very advantageously applied to the laser printer of the positive development type.

FIG. 1 illustrates a raster scan pattern on the drum surface in the positive development process. Reference numeral 55 designates irradiation with a correspondingly modulated laser beam on a single line scan base. Thus, the raster is constituted by traces of the line scans. Due to the modulation with printing information, i.e. information or data to be printed, there is produced an interrupted portion 56 which is not irradiated with light. Although the scanner itself is finished with a high precision, there may be produced an offset raster line such as indicated by A in FIG. 1 due to even a slight tilting of a mirror facet, because the raster line is of a very narrow width. As a result, a portion B which should inherently be irradiated with light remains non-irradiated, involving a stripe in black on the recording sheet after the development, to degrade the print quality. An attempt to enhance further the precision of the scanner with a view to overcoming such difficulty will incure a bloated expenditure, rendering the scanner impractical.

On the other hand, when the laser output is decreased due to deterioration of the laser device, diameter of the laser beam is correspondingly reduced, which results in that the width of the raster or scan line 55 becomes narrower to increase the raster line space, as illustrated in FIG. 2. Under the circumstances, thin lines will make appearance on the recording sheet after development.

SUMMARY OF THE INVENTION

It is an object of the present invention to improve the print quality by eliminating the difficulties of the hitherto known laser printer described above.

According to the gist of the invention, the raster scanning is effected in such a manner that a light sensitive member is scanned on a line base with a laser beam modulated with print information to be printed on one hand and on the other hand with a laser beam modulated with synthesized information which is synthesized from the print information for every two adjacent line scans so that the adjacent line scans are partially covered by the line scan for the synthesized information.

The synthesization of the pring information is effected in such a manner that irradiation with light takes place only when the print information for the adjacent lines commands irradiation with light.

DESCRIPTION OF THE PREFERRED EMBODIMENTS

Figure 1:
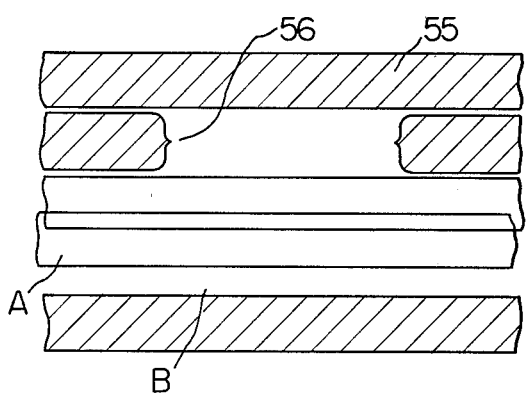
FIG. 1 shows a raster pattern on a light sensitive drum surface of a hitherto known laser beam printer.
Figure 3:
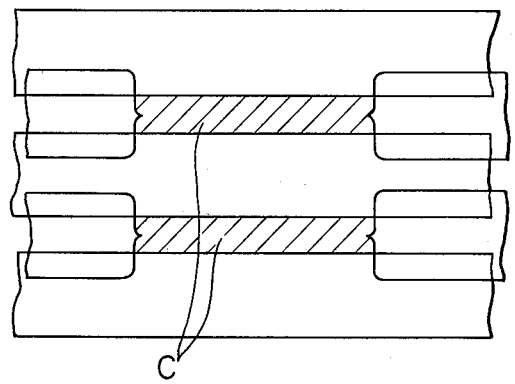
FIG. 3 shows a conceivable raster pattern.
Figure 2:
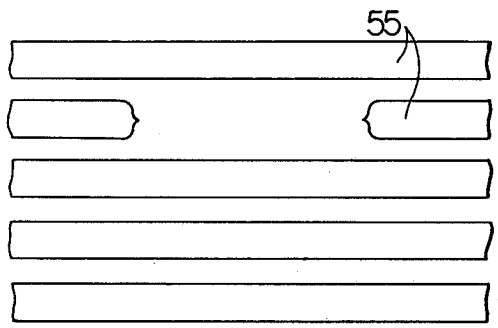
FIG. 2 shows another example of the raster pattern on the drum surface of the hitherto known laser beam printer.

As an approach to solve the problem of the higherto known laser beam printer system described above, it may be readily conceived that the raster line width is expanded so that partial overlaps are produced between adjacent raster lines, as illustrated in FIG. 3. Then, the inter-line space is difficult to make appearance on the recording sheet. However, those portions which are not irradiated with light as indicated by hatched areas C in FIG. 3 become thinner, to give rise to a new problem in that characters of a small size can not be printed with a desired clearness or distinction.

Figure 4:
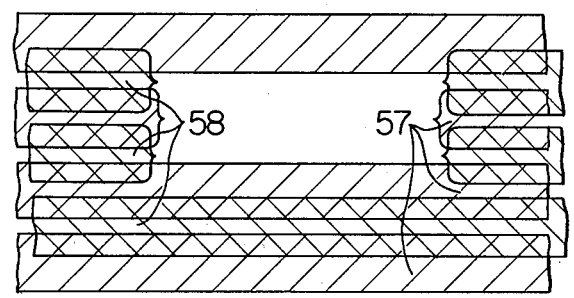
FIG. 4 illustrates a raster pattern generated according to the teaching of the invention.

FIG. 4 illustrates a line scanning with a laser beam on a drum surface in accordance with the teaching of the invention. Modulation of the laser beam with the print information or data is effected so as to conform to the positive development described hereinbefore. Reference numeral 57 designates line scans with the light beam modulated with the print data representative of patters of images to be printed out, while numeral 58 designates line scans effected with the light beam modulated with synthesized data synthesized from those which precedes and succeeds to the very synthesized data. For the convenience of description, the former is referred to simply as the raster or the raster line, while the latter is termed the synthesized raster or synthesized line, as the case may be. Hatched areas shown in FIG. 4 corresponds to those regions on the light sensitive drum which are irradiated with light. It will be noted that the so-called raster lines themselves are not overlapped each other, but the overlap portions are produced by the so-called synthesized lines.

The synthesization for producing the synthesized lines can be implemented by determining logical AND of data precedes and succeeds respectively, to those for the synthesized line in a manner summarized in the following Table I.

TABLE I

| Data for Preceding Raster Line | Data for Succeeding Raster Line | Data for Synthesized Line |
|---|---|---|
| To be irradiated | Not to be irradiated | Not to be irradiated |
| Not to be irradiated | Not to be irradiated | Not to be irradiated |
| Not to be irradiated | To be irradiated | Not to be irradiated |
| To be irradiated | To be irradiated | To be irradiated |

Figure 5:
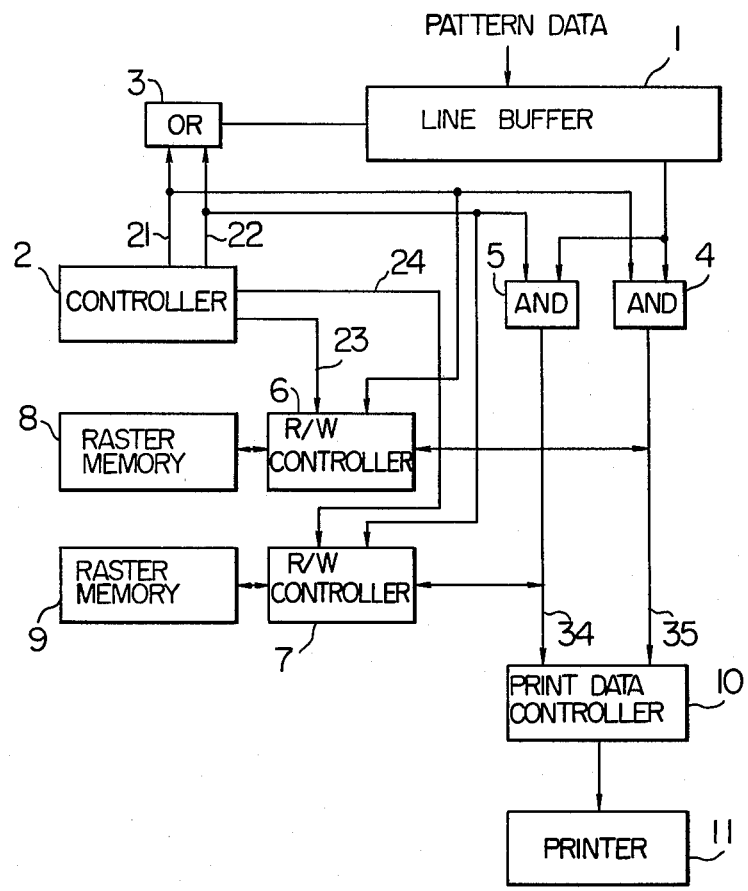
FIG. 5 shows in a block diagram a general arrangement of a laser beam printer system according to an embodiment of the invention.

FIG. 5 shows a laser beam printer provided with a printer control system according to an embodiment of the invention. In this figure, reference numeral 1 denotes a line buffer which is adapted to receive and store therein the print data or information (pattern or image data) for every row on line of patterns or characters which are represented by dot combinations and to output serially the print data for dot images for every laster line. The print data for the dot images are those which are commonly made use of in CRT displays and wire matrix printers and represents an image of a pattern such as a character in a combination of dots, wherein binary bits "1" and "0" are used in correspondence to the presence and the absence of dot, respectively. In FIG. 5, reference numerals 8 and 9 designate raster memories, respectively, for storing therein the print data for the single raster line as read out from the line buffer 1, a numeral 10 designates a print data controller which is adapted to feed the raster line data to a printer 11 or alternatively synthesize the preceding and the succeeding raster line data before being supplied to the printer 11. A numeral 2 designates a control circuit adapted to produce control signals illustrated in a signal timing diagram of FIG. 6. Numerals 6 and 7 denote read/write controllers which are set to the write mode for writing the raster line data in the raster line memories 8 and 9 in response to write command signals 21 and 22, respectively. On the other hand, the read/write controllers 6 and 7 respond to read command signals 23 and 24 to be set to the read mode for reading the raster line data from the raster memories 8 and 9, respectively. It will be appreciated that these operations of the read/write controllers 6 and 7 can be accomplished by merely changing over them alternatively between the write mode and the read mode in response to the respective command signals.

Figure 6:
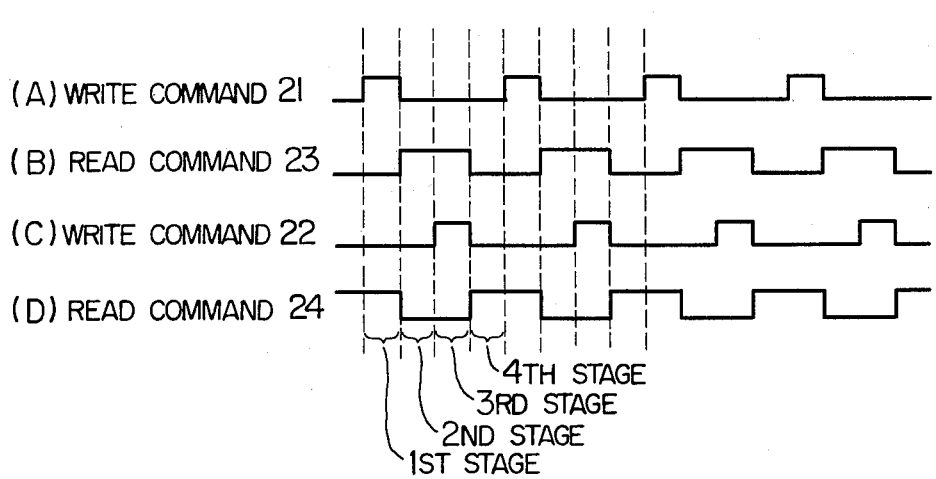
FIG. 6 shows signal waveform diagrams to illustrate control signals produced by a controller employed in the system shown in FIG. 5.
Figure 7:
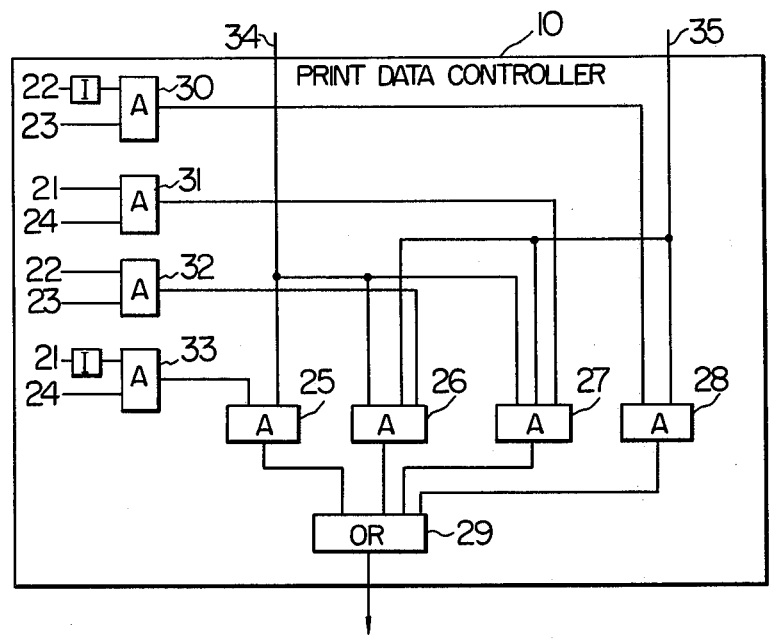
FIG. 7 is a block diagram illustrating in detail a circuit arrangement of the controller shown in FIG. 5.

Referring to the signal waveform diagram shown in FIG. 6, it is assumed that the signals 21 and 24 are at a high level in a fist stage 1. (FIG. 6 (A) and (D)). Under the conditions, the read-out command for reading data of a single raster line is applied to the line buffer 1 through an OR circuit 3. At the same time, and AND gate 4 is enabled or opened, whereby the raster line data read out from the line buffer 1 is serialy supplied to the raster memory 8 to be stored therein and also to the controller 10 by way of the read/write controller 6 which issues the write command. Synchroneously, the data stored in the raster memory 9 is read out throught the read/write controller 7 which is set to the read mode by the command signal 24 and supplied to the controller 10. In this connection, it should however be noted that there is no data contained in the raster memory 9 at the beginning of the printing process. A circuit arrangement of the print data controller 10 is shown in detail in FIG. 7. Since the command signals 21 and 24 are at high level in the first stage, an AND gate 31 is opened to enable an AND gate 27. However, because no data appears on a signal line 34, no output is produced from the AND gate 27 after all. In the second stage (refer to FIG. 6 (B)), only the command signal 23 is at high level, whereby the data stored in the raster memory 8 is transferred to the controller 10. Then, an AND gate 30 of the controller 10 is opened to enable an AND gate 28, whereby the data appearing on a signal line 35 is supplied, as it is, to the printer 11 through an OR gate 29. In the third stage, the command signals 22 and 23 are at high level, as can be seen from FIG. 6 (B) and (C). In this stage, the read-out command is issued to the line buffer 1 through the OR gate 3. Then, the next raster line data is read out from the line buffer 1 to be stored in the raster memory 9 by way of the read/write controller 7 and at the same time supplied to the controller 10 through the AND gate 5. Additionally, data is read out from the raster memory 8. At this time, and AND gate 32 of the controller 10 is opened, resulting in that data on both the signal lines 34 and 35 are supplied to the printer 11 from the output of an AND gate 26 through the OR gate 29. In this manner, a synthesized data is prepared as the logical product of the proceding raster line data being read out from the raster memory 8 and the succeeding raster line data being transmitted through the AND gate 5 and supplied to the printer 11.

Referring again to FIG. 4, it is assumed that the image or pattern data is so prepared that blank areas on the line on the recording sheet which are not to be irradiated with light correspond to binary digits "1" of the raster line data with the other areas corresponding to binary digits "0", whereby the control is performed in such a manner that the drum surface is exposed to irradiation in response to the binary digits "1". Then, the synthesized raster line 58 is irradiated with light only when binary digits of both data for the preceding and the succeeding raster lines are simultaneously logic "1". In the fourth stage, only the command signal 24 is at high level. As a result, data stored in the raster memory 9 is read out serially to be supplied to the AND gate 25. This raster line data is sent out sequentially through the AND gate 33 which is in the opened state and the OR gate. Next, the first stage is regained. At this time, since the raster memory 9 contains the data which has already been sent out, the synthesized data signal produced as the logical product of the data contained in the memory 9 and the incoming data through the AND gate 4 is supplied to the printer. Operations in the first to fourth stages described above will then be repeated.

By virtue of the control functions described above, it is possible to prepare the synthesized data as the logical product of the preceeding and the succeeding raster line data for every sending of the data for a single raster line which contains print information to be represented in the dot images or patterns. In the printer 11, the laster beam impinging onto the drum is interrupted in dependence on the data supplied to the printer 11.

Figure 8:
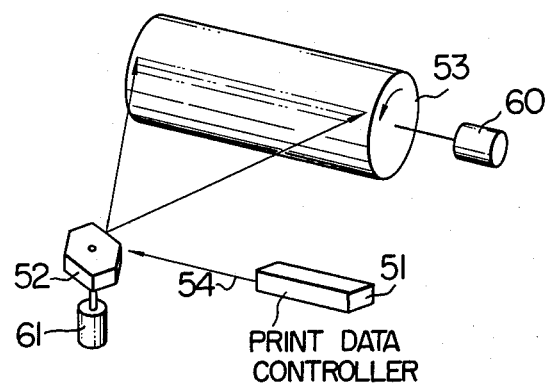
FIG. 8 shows schematically an exemplary embodiment of a printer employed in the system shown in FIG. 5.

A typical structure of the printer 11 is schematically shown in FIG. 8. Referring to this figure, a reference numeral 51 designates a laser oscillator which is adapted to generate a laser beam 54 modulated in dependence on the data supplied from the print data controller O. A scanner 52 constituted by a polyhedron mirror is rotated by a motor 61. Each of the single line scans can be performed on the drum surface by each of the mirror facets. The drum 53 is rotated by motor 60 in the direction indicated by an arrow. The rate at which data is furnished from the pring data controller 10 as well as the rotational speeds of the scanner 52 and the drum 53 are selected such that data of the raster lines which corresponds to the number of the mirror facets of the scanner 52 is supplied from the print data controller 10 during a single revolution of the scanner 52. This results in that the line scan is so effected that the adjacent raster lines are partially covered by the synthesized line, as is shown in FIG. 4.

As will be appreciated from the foregoing description, appearance of fine lines or stripes on a recording sheet due to positional displacement of the raster lines can be positively suppressed by generating the raster lines based on the synthesized data between the inherent raster lines generated on the basis of the data to be printed out according to the teaching of the invention. Further, since these raster lines which constitute data prints are not superposed each other, but they are partially covered by the synthesized lines, the portions printed in black will never be narrowed, assuring thus a print of an improved quality.

We claim:

1. A laser beam printer in which a light sensitive member is scanned on a line base with a laser beam modulated with pattern data to be printed out, comprising:

first means for furnishing the pattern data on a single-line base;

second means receiving the pattern data from said first means for interposing synthesized data each between adjacent ones of said pattern data, said synthesized data being synthesized from the pattern data which preceedes to and succeed to said synthesized data, respectively; and third means receiving the output from said second means for scanning said light-sensitive member with the laser beam modulated with the output from said second means on the line base so that adjacent lines as scanned are partially superposed on each other.

2. A laser beam printer as set forth in claim 1, wherein said laser beam is modulated in such a manner that said light-sensitive member is irradiated except for those portions which are to be printed.

3. A laser beam printer as set forth in claim 2, wherein said pattern data is constituted by a set of first binary digits which command the irradiation with the laser beam and second binary digits commanding nonirradiation, said second means being adapted to carry out said synthesization on the basis of logical AND of said first binary digits.

4. A laser beam printed as set forth in claim 3, wherein said first means is adapted to furnish the pattern data for every scan line with a predetermined time interval, said second means comprising:

first and second memories for storing data corresponding to the single line, respectively;

means for storing the data supplied from said first means and corresponding to the single line in one of said first and second memories alternatively and produce as the output the logic product of the data stored in the other memory and the data received from said first means; and first-in first-out means for outputting the data received earlier among the data stored in said first and said second memories at said time interval.

* * * * *